(12) United States Patent
Jensen et al.

(10) Patent No.: US 6,396,660 B1
(45) Date of Patent: May 28, 2002

(54) MAGNETIC WRITE ELEMENT HAVING A THERMALLY DISSIPATIVE STRUCTURE

(75) Inventors: William Jensen, Fremont; Mark David Thomas, Hollister; Zhupei Shi; Billy W. Crue, Jr., both of San Jose, all of CA (US)

(73) Assignee: Read-Rite Corporation, Fremont, CA (US)

( * ) Notice: Subject to any disclaimer, the term of this patent is extended or adjusted under 35 U.S.C. 154(b) by 0 days.

(21) Appl. No.: 09/379,892

(22) Filed: Aug. 23, 1999

(51) Int. Cl.⁷ .................................. G11B 5/31
(52) U.S. Cl. ........................ 360/126; 360/123
(58) Field of Search ................ 360/110, 125, 360/126, 127, 117, 123

(56) References Cited

U.S. PATENT DOCUMENTS

| | | | |
|---|---|---|---|
| 4,052,749 A | | 10/1977 | Nomura et al. |
| 4,127,884 A | | 11/1978 | Nouchi et al. |
| 4,429,337 A | | 1/1984 | de Wilde |
| 4,435,900 A | | 3/1984 | de Wilde |
| 4,639,289 A | * | 1/1987 | Lazzari .................. 216/22 |
| 4,924,198 A | | 5/1990 | Laskaris |
| 5,386,275 A | | 1/1995 | Kato et al. |
| 5,793,578 A | | 8/1998 | Heim et al. |
| 6,028,750 A | * | 2/2000 | Ohtsubo ................ 360/126 |
| 6,043,959 A | * | 3/2000 | Crue et al. ............. 360/317 |
| 6,104,575 A | * | 8/2000 | Ikegawa et al. ....... 360/126 |
| 6,130,805 A | * | 10/2000 | Sasaki et al. .......... 360/126 |
| 6,137,662 A | * | 10/2000 | Huai et al. .......... 360/327.22 |
| 6,156,375 A | * | 12/2000 | Hu et al. ................ 427/116 |
| 6,163,436 A | * | 12/2000 | Sasaki et al. .......... 360/126 |
| 6,166,880 A | * | 12/2000 | Kobayshi et al. ..... 360/126 |
| 6,168,860 B1 | * | 1/2001 | Daughton ............. 428/332 |
| 6,169,642 B1 | * | 1/2001 | Mino et al. ........... 360/126 |
| 6,171,716 B1 | * | 1/2001 | Sasaki et al. ......... 428/692 |
| 6,181,514 B1 | * | 1/2001 | Santini et al. ........ 360/126 |
| 6,188,544 B1 | * | 2/2001 | Mino .................... 360/126 |
| 6,191,495 B1 | * | 2/2001 | Kossives et al. ...... 257/798 |
| 6,191,916 B1 | * | 2/2001 | Sasaki .................. 360/126 |
| 6,191,917 B1 | * | 2/2001 | Dee et al. ............. 360/126 |
| 6,191,918 B1 | * | 2/2001 | Clarke et al. ........ 360/126 |
| 6,204,997 B1 | * | 3/2001 | Sasaki et al. ......... 360/123 |
| 6,204,999 B1 | * | 3/2001 | Crue et al. ........... 360/126 |
| 6,207,466 B1 | * | 3/2001 | Kamijama ............. 483/3 |

* cited by examiner

*Primary Examiner*—Robert S. Tupper
(74) *Attorney, Agent, or Firm*—Carr & Ferrell LLP (57) ABSTRACT

A magnetic read/write head having improved thermal characteristics. The read/write head includes a read element and a write element formed there over. The read element includes a read sensor embedded within a dielectric material and sandwiched between first and second shields. The write element includes first and second poles joined to form a yoke. The yoke is closed at one end and defines a write gap at the other. A coil having windings which extend through the yoke generates a magnetic flux within the yoke. This magnetic flux causes a magnetic fringe field at the location of the write gap, the fringe field being capable of imparting a magnetic signal onto a passing magnetic medium. The coil sits atop a thermally conductive, electrically insulating material which electrically isolates the coil from surrounding structure. When a current flows through the coil, heat will be generated. Such heat, which could be detrimental to read performance, is conducted through the thermally conductive material out of the yoke and away from the write element. The thermally conductive material provides a large heat sink for dissipation of the heat.

20 Claims, 12 Drawing Sheets

MAGNETIC WRITE ELEMENT HAVING A THERMALLY DISSIPATIVE STRUCTURE

BACKGROUND OF THE INVENTION

This invention relates generally to magnetic disk data storage systems, and more particularly to magnetic write transducers and methods for making same.

Figure 1A:
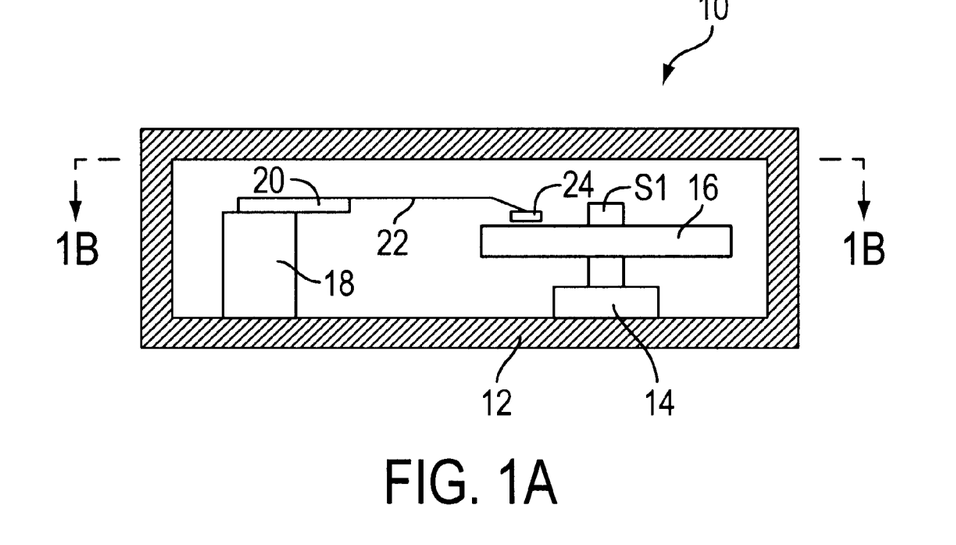
FIG. 1A is a partial cross-sectional front elevation view of a magnetic data storage system.
Figure 1B:
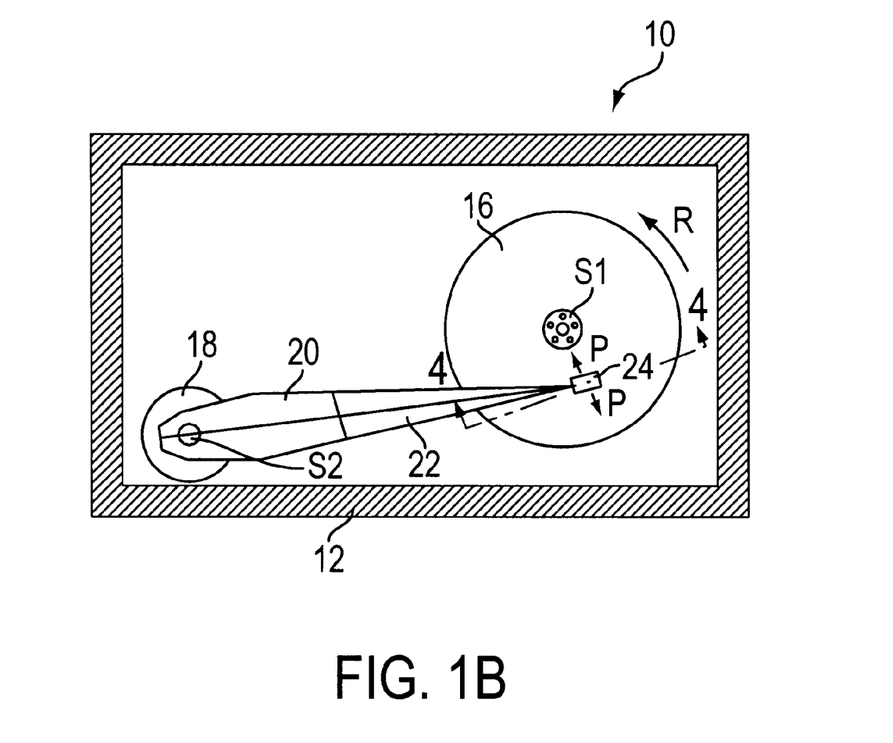
FIG. 1B is a top plan view taken along line 2B—2B of FIG. 2A.

Magnetic disk drives are used to store and retrieve data for digital electronic apparatuses such as computers. In FIG. 1A and 1B, a magnetic disk data storage systems 10 of the background art includes a sealed enclosure 12, a disk drive motor 14, a magnetic disk 16, supported for rotation by a drive spindle S1 of motor 14, an actuator 18 and an arm 20 attached to an actuator spindle S2 of actuator 18. A suspension 22 is coupled at one end to the arm 20, and at its other end to a read/write head or transducer 24. The transducer 24 (which will be described in greater detail with reference to FIG. 2A) typically includes an inductive write element with a sensor read element. As the motor 14 rotates the magnetic disk 16, as indicated by the arrow R, an air bearing is formed under the transducer 24 causing it to lift slightly off of the surface of the magnetic disk 16, or, as it is termed in the art, to "fly" above the magnetic disk 16. Alternatively, some transducers, known as "contact heads," ride on the disk surface. Various magnetic "tracks" of information can be written to and/or read from the magnetic disk 16 as the actuator 18 causes the transducer 24 to pivot in a short arc as indicated by the arrows P. The design and manufacture of magnetic disk data storage systems is well known to those skilled in the art.

Figure 2A:
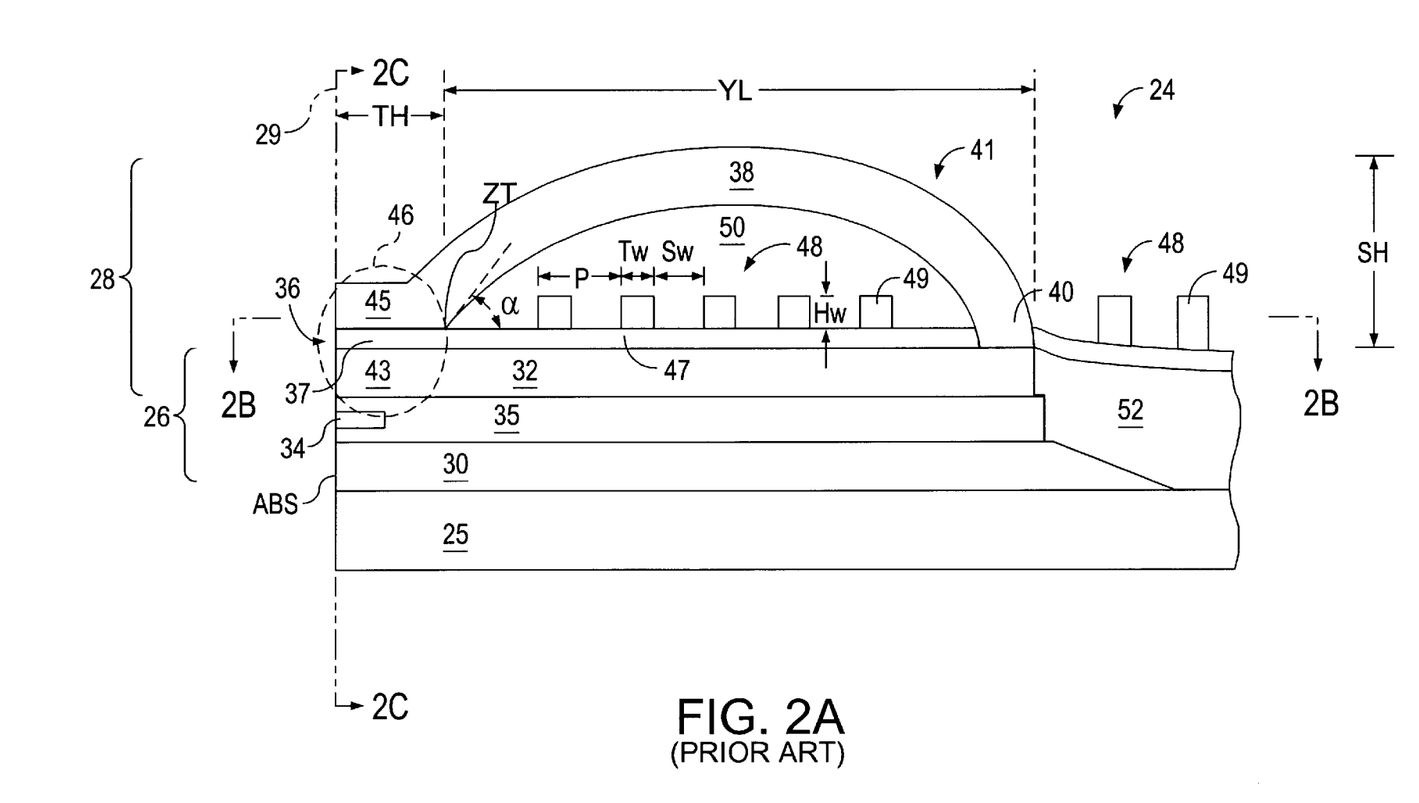
FIG. 2A is a cross-sectional view of a background art read/write head of the magnetic disk dive assembly of FIG. 1A and 1B.

FIG. 2A depicts a magnetic read/write head 24 including a substrate 25 above which a read element 26 and a write element 28 are disposed. Edges of the read element 26 and write element 28 also define an air bearing surface ABS, in a plane 29, which can be aligned to face the surface of the magnetic disk 16 (see FIG. 1A and 1B). The read element 26 includes a first shield 30, an intermediate layer 32, which functions as a second shield, and a read sensor 34 that is located within a dielectric medium 35 between the first shield 30 and the second shield 32. The most common type of read sensor 34 used in the read/write head 24 is the magnetoresistive (AMR or GMR) sensor which is used to detect magnetic field signals from a magnetic medium through changing resistance in the read sensor.

The write element 28 is typically an inductive write element which includes the intermediate layer 32, which functions as a first pole, and a second pole 38 disposed above the first pole 32. The first pole 32 and the second pole 38 are attached to each other by a backgap portion 40, with these three elements collectively forming a yoke 41. The combination of a first pole tip portion 43 and a second pole tip portion 45 near the ABS are sometimes referred to as the yoke tip portion 46. A write gap 36 is formed between the first and second poles 32, 38 in the yoke tip portion 46. The write gap 36 is filled with a non-magnetic electrically insulating material that forms a write gap material layer 37. This non-magnetic material can be either integral with (as is shown here) or separate from a first insulation layer 47 that lies below the second yoke 38 and extends from the yoke tip portion 46 to the backgap portion 40.

Also included in write element 28 is a conductive coil 48, formed of multiple winds 49 which each have a wind height Hw. The coil 48 can be characterized by a dimension sometimes referred to as the wind pitch P, which is the distance from one coil wind front edge to the next coil wind front edge, as shown in FIG. 2A. As is shown, the wind pitch P is defined by the sum of the wind thickness Tw and the separation between adjacent winds Sw. The conductive coil 48 is positioned within a coil insulation layer 50 that lies above the first insulation layer 47. The first insulation layer 47 thereby electrically insulates the coil layer from the first pole 32, while the coil insulation layer 50 electrically insulates the winds 49 from each other and from the second pole 38.

Figure 2B:
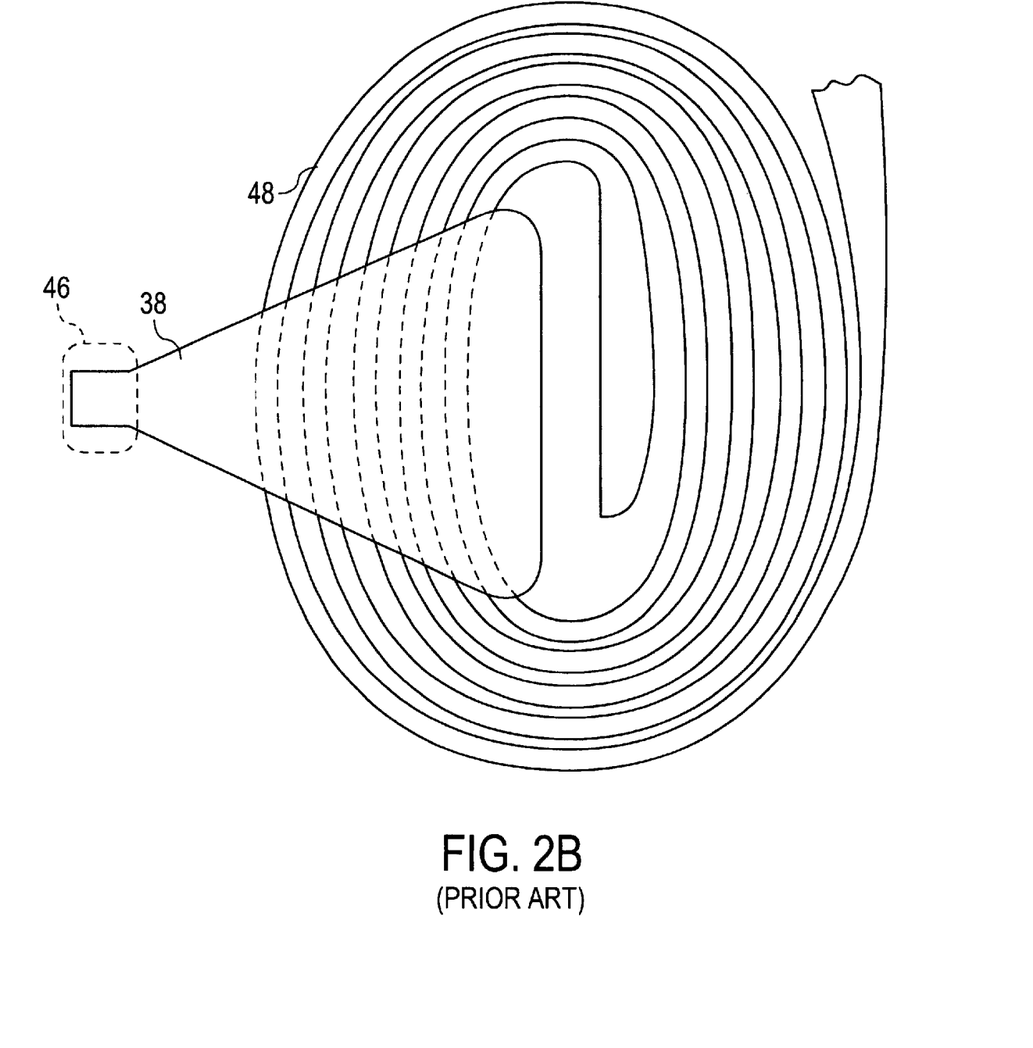
FIG. 2B is a plan view taken along line 2B—2B of FIG. 2A.
Figure 2C:
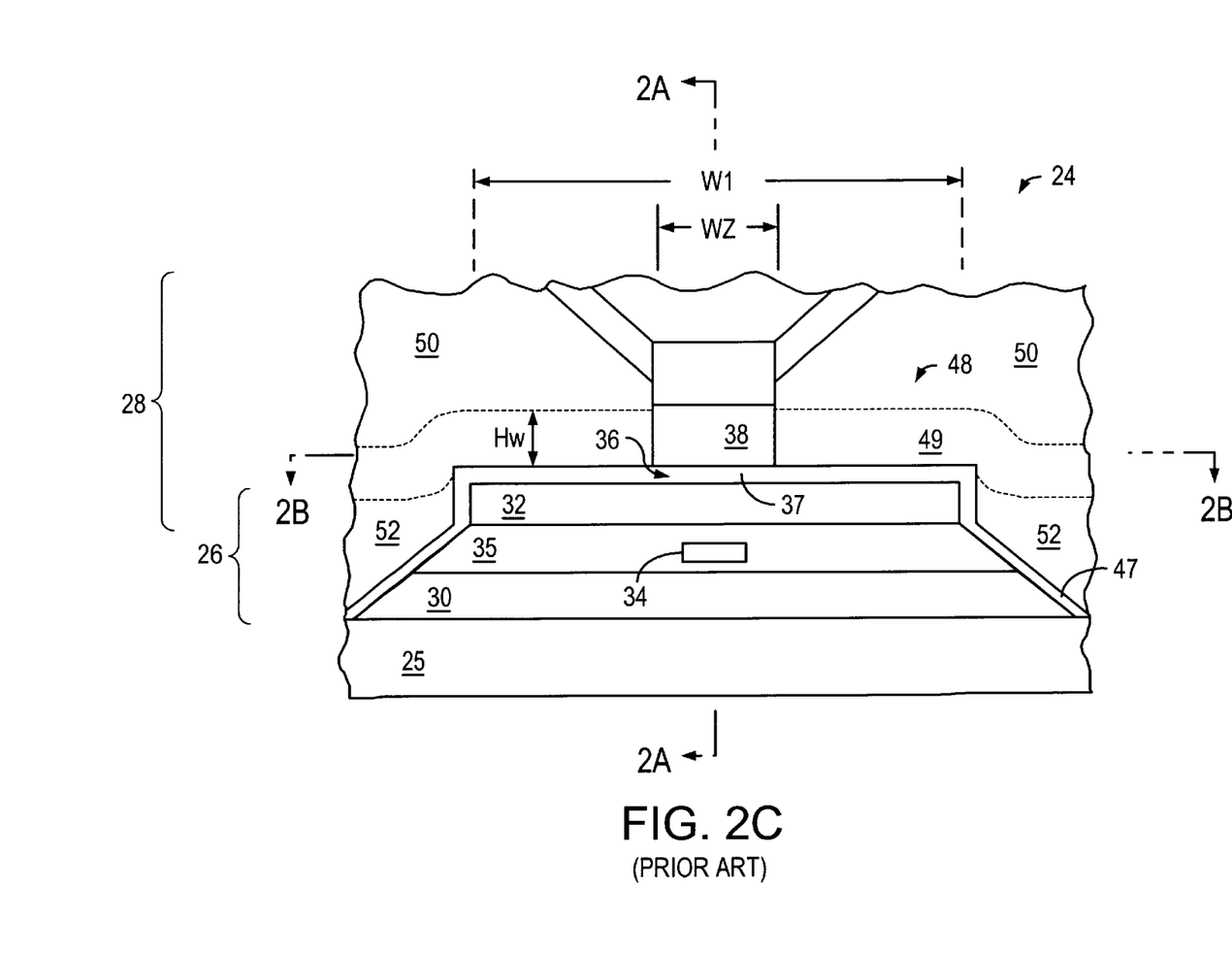
FIG. 2C is an ABS view taken along line 2C—2C of FIG. 2A.

The configuration of the conductive coil 48 can be better understood with reference to a plan view of the read/write head 24 shown in FIG. 2B taken along line 2B—2B of FIG. 2A. Because the conductive coil extends beyond the first and second poles, insulation may be needed beneath, as well as above, the conductive coil to electrically insulate the conductive coil from other structures. For example, as shown in FIG. 2C, a view taken along line 2C—2C of FIG. 2A, a buildup insulation layer 52 can be formed adjacent the first pole, and under the conductive coil layer 48. As is well known to those skilled in the art, these elements operate to magnetically write data on a magnetic medium such as a magnetic disk 16 (see FIGS. 1A and 1B).

More specifically, an inductive write head such as that shown in FIGS. 2A–2C operates by passing a writing current through the conductive coil layer 48. Because of the magnetic properties of the yoke 41, a magnetic flux is induced in the first and second poles 32, 38 by write currents passed through the coil layer 48. The write gap 36 allows the magnetic flux to fringe out from the yoke 41 (thus forming a fringing gap field) and to cross a magnetic recording medium that is placed near the ABS. A critical parameter of a magnetic write element is a trackwidth of the write element, which defines track density. For example, a narrower trackwidth can result in a higher magnetic recording density. The trackwidth is defined by geometries in the yoke tip portion 46 (see FIG. 2A) at the ABS. These geometries can be better understood with reference to FIG. 2C. As can be seen from this view, the first and second poles 32, 38 can have different widths W1, W2 respectively in the yoke tip portion 46 (see FIG. 2A). In the shown configuration, the trackwidth of the write element 28 is defined by the width W2 of the second pole 38. The gap field of the write element can be affected by the throat height TH, which is measured from the ABS to the zero throat ZT, as shown in FIG. 2A. Thus, accurate definition of the trackwidth and throat height is critical during the fabrication of the write element.

Figure 2D:
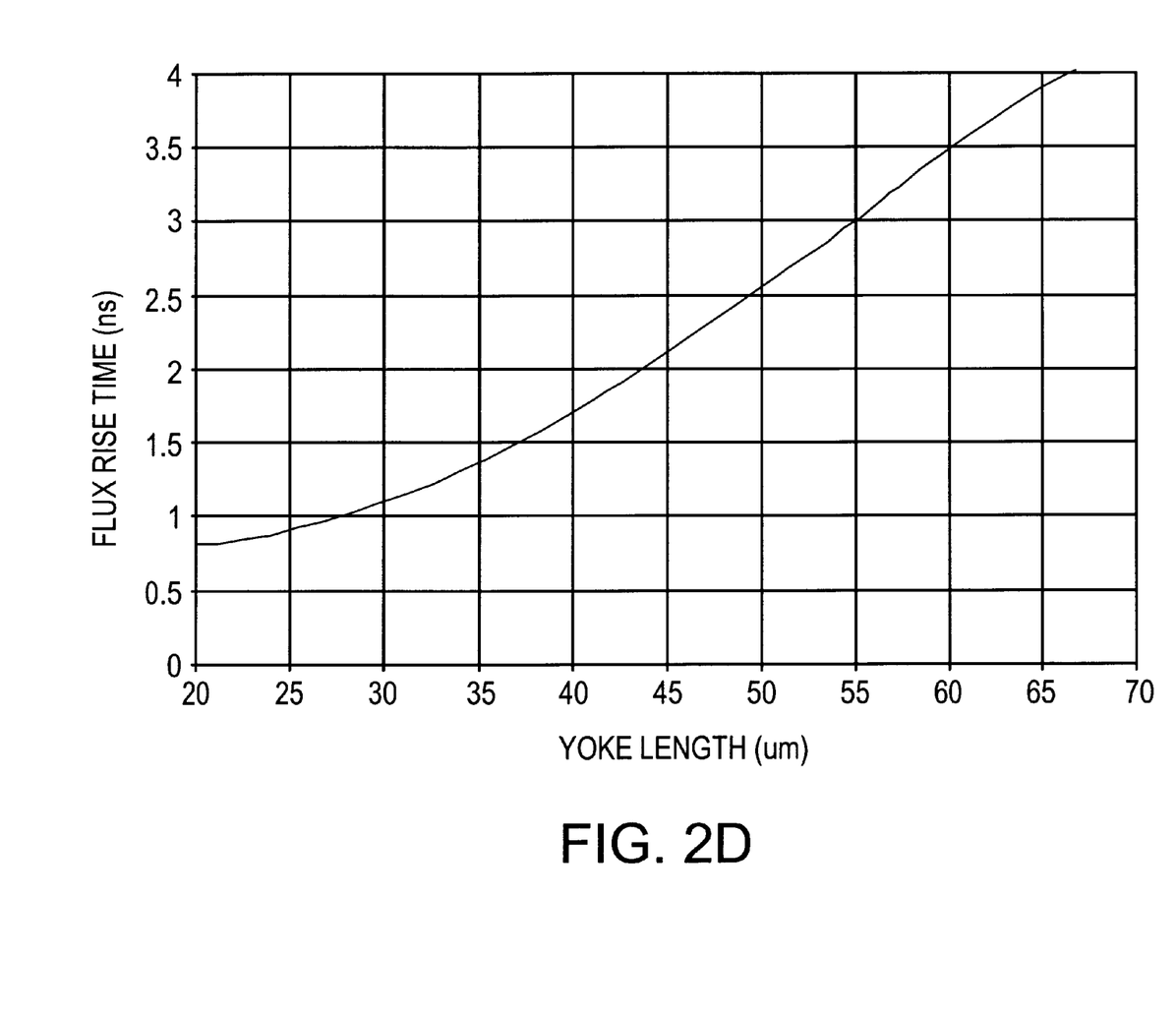
FIG. 2D is a representative graph of a relationship between yoke length and flux rise time.

Another parameter of the write element is the number of winds 49 in the coil layer 48, which determines magnetic motive force (MMF) of a write element. With increasing number of winds 49 between the first and second poles 32, 38, the fringing field is stronger and, thus, the write performance increases. The number of winds is limited by the yoke length YL, shown in FIG. 2A, and the pitch P between adjacent winds 49. However, to obtain faster recording speeds, and therefore higher data transfer rates, it may be desirable to have a shorter yoke length YL because this can shorten the flux rise time. This relationship can be seen in the graph of yoke length YL versus flux rise time shown in FIG. 2D. Therefore, to maximize the number of coil winds while maintaining fast write speeds, it is desirable to minimize the pitch P in design of write elements.

Figure 3:
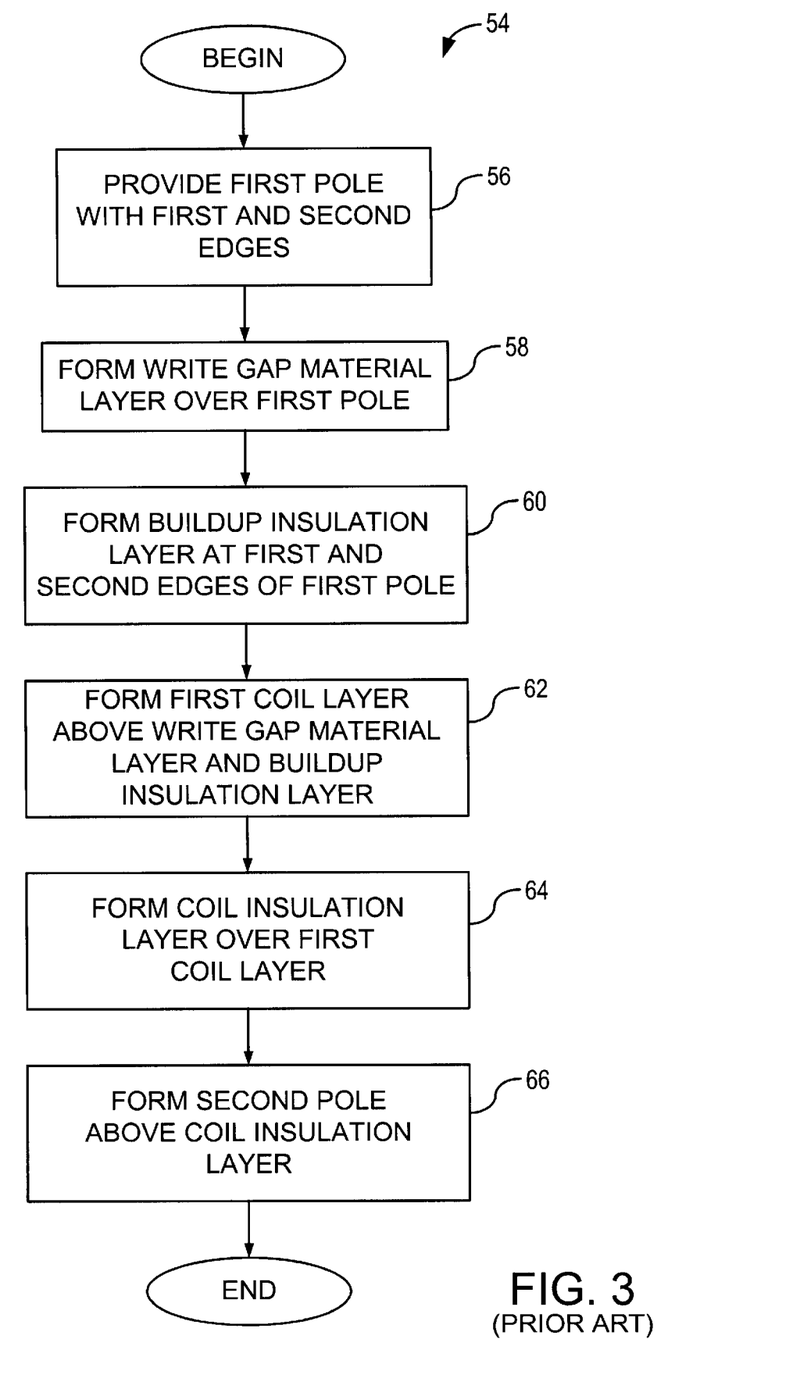
FIG. 3 is a process diagram of a method for forming a write element of the background art.

However, the control of trackwidth, throat height, and coil pitch can be limited by typical fabrication processes, an example of which is shown in the process diagram of FIG. 3. The method 54 includes providing a first pole with first and second edges in operation 56. This operation can include, for example, forming a plating dam, plating, and then removing the dam. In operation 58, a write gap material layer is formed over the first pole. In particular, the write gap material layer is formed over an upper surface and the first and second edges of the first pole. Also, in operation 58, a via is formed through the write gap material layer to the first pole in the backgap portion 40 (see FIG. 2A). In the instance herein described, the write gap material layer extends above the first pole in the area between the yoke tip portion and the backgap portion, although in other cases the write gap material layer may not be above this area. A buildup insulation layer is also formed in operation 60, adjacent the first and second edges, with the write gap material layer between the first pole and the buildup insulation layer. The buildup insulation layer is typically formed by depositing (e.g., spinning) and patterning photoresistive material and then hard baking the remaining photoresistive material. Such processes often result in the height of the buildup insulation layer being non-uniform and different than the height of the write gap material layer, as is illustrated in FIGS. 2A and 2C.

The method 54 also includes forming a first coil layer above the write gap material layer and the buildup insulation layer in operation 62. This can include first depositing a seed layer above the first pole. Typically, photoresistive material can then be deposited and patterned. With the patterned photoresistive material in place, conductive material can be plated. With removal of the photoresistive material, the remaining conductive material thereby forms the coil.

Unfortunately, when there is a difference in height between the write gap material layer and the buildup insulation layer, the patterning of the photoresistive material for the first coil layer can be complicated. In particular, it can be difficult to pattern the various heights to have consistent geometries. More specifically, winds of the resulting first coil layer can be wider at lower levels than at higher levels, such as between the first and second poles. Thus, for a given pitch, such greater width at the lower levels can result in smaller distances between winds. This can, in turn, result in electrical shorting between winds which can be detrimental to the write element performance. To avoid such electrical shorting, the minimum wind pitch can be set to a desired value that will result in adequate yield of non-shorting conductive coil layers. Because the coil winds are more narrow between the first and second poles, the resulting pitch there is typically greater than, and limited by this minimum. For example, typical wind pitches between the first and second poles may be limited to no less than about 3 microns. For a given number of winds and wind thickness, this in turn limits the minimum yoke length, and thereby limits the data transfer rate and data density as described above. For example, a pitch of about 3 microns may be adequate for recording densities on the order of about 2 Gb/sq.in., however, these typical pitches can be inadequate for larger recording densities, such as about 10 Gb/sq.in.

In operation 64, the method 54 further includes forming a coil insulation layer above the first coil layer that is formed in operation 62. In addition, in operation 66 a second pole is formed above the coil insulation layer of operation 64.

Still another parameter of the write element is the stack height SH, the distance between the top surface of the first pole 32 and the top of the second pole 38, as shown in FIG. 2A. Of course, this height is affected by the thickness of the first insulation layer 47, the thickness of the coil layer 48 and any other coil layers that might be included, and the height Hi of the coil insulation layer 50 and any other coil insulation layers that might be included. The stack height SH can be an indicator of the apex angle α, which partially characterizes the topology over which the second pole must be formed near the yoke tip portion. Typically, the reliability of the write element decreases as the apex angle α increases. This is due, at least in part, to the corresponding increased difficulty, particularly in the yoke tip portion 46, of forming the second pole 38 over the higher topography of the stack. For example, the definition of the second pole width W, shown in FIG. 2C, including photoresist deposition and etching, can be decreasingly reliable and precise with increasing topography. When demand for higher density writing capabilities drives yoke tip portions to have smaller widths W, this aspect of fabrication becomes increasingly problematic.

In attempts to accommodate ever increasing data rate requirements, the above described design parameters are continually adjusted to the limits of available manufacturing capabilities. For example, yoke length YL must be shortened in order to minimize flux rise time. This means that the pitch P of the coil 48 must be minimized, requiring a reduction in wind thickness Tw accordingly. The reduction in wind thickness leads to a corresponding increase in electrical resistance in the winds 49.

Also, in order to minimize the yoke length YL, the number of winds 49 in a coil 48 must be reduced. However, with less winds available the current generated through the coil must be increased in order to maintain a sufficient magnetic motive force. This increase in current through the coil 48 along with the increased resistance of the winds 49, causes a dramatic increase in heat generation. The heat generated by the coil 48 during operation is defined by the formula $W=I^2R$, where W is the amount of heat generated per second, I is the current flowing through the coil, and R is the electrical resistance of the coil.

The increased heat generated by a coil 48 of a high performance write element 28 degrades the performance of the read element 26. One reason for this decrease in performance is that the heat will cause thermal stresses on the read/write head 24 as the various materials expand at different rates. These thermal stresses will in turn cause magnetic domain motion in shield 32 which generates magnetic flux into read sensor 34. Due to magneto-resistive properties of the sensor, this undesired magnetic flux will be interpreted as a magnetic field. Another reason for this degradation of performance is that heat conducted to the read sensor 34 will cause "Johnson Thermal Noise". "Johnson Thermal Noise" is proportional to $(\omega)(K_BT)(R)$ where ω is the frequency of the signal being read, $K_BT$ is the temperature of the sensor in degrees Kelvin and R is the resistance of the sensor.

Therefore, there remains a need for a high performance read/write head which can accommodate high data rate transfer while effectively dealing with increased heat generation. Such a read/write head would preferably experience negligible thermal interference in its read element, and would preferably not require an appreciable increase in manufacturing cost.

SUMMARY OF THE INVENTION

The present invention provides a magnetic write head, and a method for manufacturing same, having a structure for dissipating heat. The write head includes first and second magnetic poles joined at one end to form a yoke. A coil having a portion of its winds extending through the yoke imparts a magnetic flux through the yoke when an electrical current is caused to flow through the coil. The coil sits upon a layer of dielectric, thermally conductive material, which conducts and dissipates heat generated by the coil.

The preferred embodiment of the present invention includes a read element and a write element combined to form a combination read/write head, all of which is built upon a ceramic substrate. The read portion of the head includes a read sensor embedded within a first dielectric layer. This first dielectric layer is sandwiched between a first and a second shield.

The second shield of the read element serves as a portion of the first pole of the write element. The second shield/first pole has a flat upper surface, from which extends a write gap pedestal and a back gap pedestal. A second dielectric layer is formed over the first pole, and is planarized by a chemical mechanical polishing process. The polishing process exposes the flat upper surfaces of the pedestals and creates a smooth planar surface across the pedestals and the dielectric layer. The second dielectric layer is constructed of an electrically insulating, thermally conducting material, and extends laterally across the substrate beyond the first pole to provide an effective heat sink.

Upon the smooth surface of the second dielectric layer the coil is formed, including a pair of contacts at the inner and outer ends of the coil. An insulation layer is deposited over the coil and formed so as to not cover the back gap or write gap pedestal. In addition, the insulation layer is formed with openings called "vias" at the location of the contacts of the coil. A thin layer of electrically insulating, non-magnetic material is then deposited over the insulation layer and over the write gap pedestal. Again, the write gap material is formed so that it does not cover the back gap pedestal or the contacts of coil, although it does cover the write gap pedestal.

To complete the read/write head, the second pole is formed over the first pole. The back of the second pole contacts the back gap pedestal of the first pole, and the front of the second pole sits atop the write gap material above the write gap pedestal of the first pole.

In use, when a voltage is applied to the contacts of the coil, a current will flow through the coil. This current will generate heat according to the formula $W=I^2R$, where W is the heat generated per second, I is the current flowing through the coil, and R is the resistance of the coil. The heat generated by the coil will flow through the thermally conductive second dielectric layer. The heat will be conducted out of the yoke through this dielectric layer and dissipated so that it will not affect the read performance of the read/write head.

These and other advantages of the present invention will become apparent to those skilled in the art upon a reading of the following descriptions of the invention and a study of the several figures of the drawings.

BRIEF DESCRIPTION OF THE DRAWINGS

The present invention will be readily understood by the following detailed description in conjunction with the accompanying drawings, with like reference numerals designating like elements.

DETAILED DESCRIPTION OF THE PREFERRED EMBODIMENTS

Figure 4:
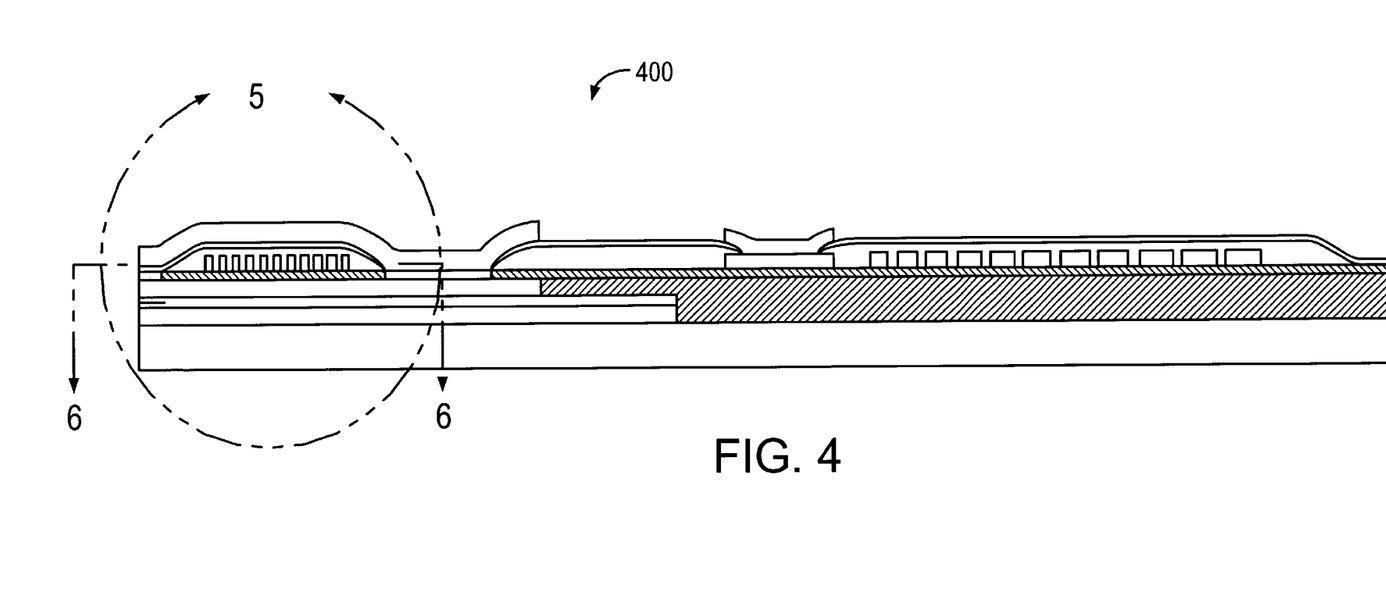
FIG. 4 is a cross sectional view of a read write head of the present invention taken along line 4—4 of FIG. 1B shown expanded and rotated 110 degrees clockwise.
Figure 5:
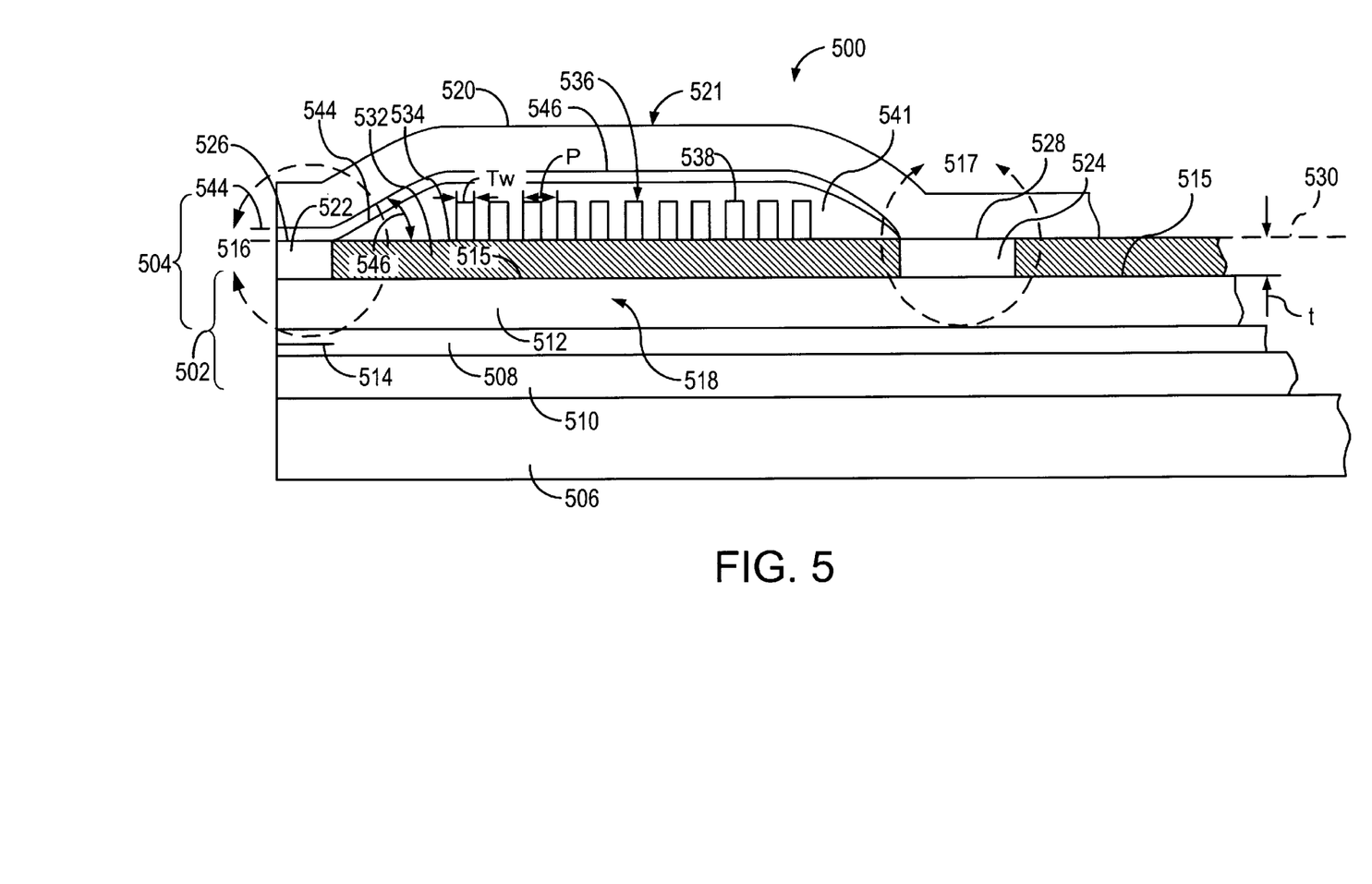
FIG. 5 is an expanded view taken from region 5 of FIG. 4.

With reference to FIG. 4, and more particularly to FIG. 5, the present invention is embodied in a magnetic read/write head, generally referred to as 500, for use in a magnetic disk data storage system 10 (FIGS. 1A and 1B). FIG. 4 shows a cross sectional view of a read/write head 400 of the present invention. FIG. 5 shows an expanded view taken from region 5 of FIG. 4. With reference to FIG. 5 the read/write head 500 includes a read element 502 and a write element 504 disposed atop a ceramic substrate 506. As with the prior heads of the background art, the read element 502 of the read/write head 500 includes a first dielectric layer 508 sandwiched between first and second shields 510 and 512. The read element further includes a read sensor 514 embedded within the first dielectric layer 508 between the first and second shields 510 and 512.

With continued reference to FIG. 5, the write element 504 includes the second shield 512 which serves as a portion of a first pole 518 and has a planar upper surface 515. A second pole 520 joins with the first pole 518 to form a yoke 521 having a write gap portion 516 and a back gap portion 517. A write gap pedestal 522, located in the write gap portion 516 extends upward from the planar upper surface 515. Similarly, a back gap pedestal extends upward from the planar upper surface in the back gap portion 517. The write gap pedestal 522 and the back gap pedestal 524 each have flat upper surfaces 526 and 528 respectively which are coplanar across a plane 530.

Figure 6:
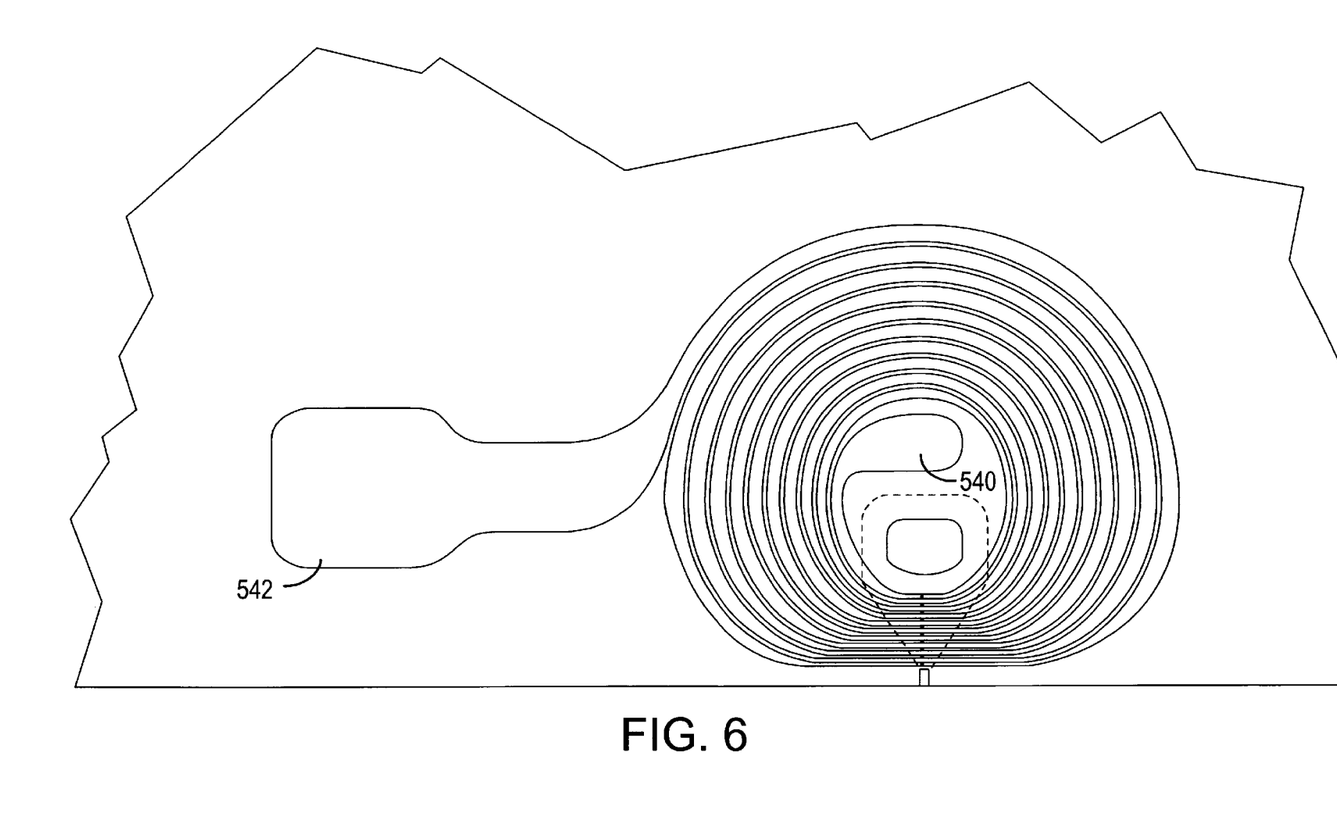
FIG. 6 is a plan view taken from line 6—6 of FIG. 4.

With reference to FIGS. 5 and 6, a second dielectric layer 532 covers the first pole 518, surrounding the pedestals 522 and 524. As shown more clearly in FIG. 6, the dielectric layer extends laterally beyond the first pole 518. The second dielectric layer is planarized by a chemical mechanical polish (CMP) process which gives it a smooth, flat upper surface 534 which is coplanar with the plane 530 and flush with the upper surfaces 526 and 528 of the pedestals 522 and 524. The second dielectric layer 532 is constructed of a material which is both an electrical insulator and a thermal conductor. The thermal conductivity of the dielectric layer should be at least twice that of alumina ($Al_2O_3$), preferably the thermal conductivity should be at or above 24 W/m°K at 40° Celsius and at or above 65 W/m°K at 20° Celsius. While several materials could provide the necessary electrical resistance and thermal conductance, in the preferred embodiment the dielectric layer is constructed of $Al_3N_4$, deposited by a reactive ion sputtering process. Alternatively, the second dielectric layer 532 could be constructed of $Si_3N_4$, or of $Si_3O_3$. The deposited planarized dielectric layer 532 has a thickness t which should be within the range of ½ to 1-½ microns and is more preferably between 1 and 1-½ microns.

A coil 536 is formed on top of the second dielectric layer such that a portion of the coil passes through the yoke 521 between the first and second poles 518 and 520 and between the write gap and back gap pedestals 522 and 524 respectively. While the coil 536 could be formed of any suitable conductive material, it is preferably formed of copper (Cu). The coil 536 includes a plurality of winds 538 which define a pitch p, defined as the distance from an edge of a wind to the corresponding edge of an adjacent wind. Each wind has a wind thickness Tw. With reference to FIG. 6 the coil terminates at its inner and outer ends in first and second contacts 540 and 542 respectively.

An insulation layer 541 covers the coil 536 and electrically isolates it from the surrounding structure as well as isolating the winds 538 from one another. The insulation layer 541 is preferably a photoresist which can be spun onto the coil 536 and the dielectric layer 532 and then cured. The insulation layer 541 will be deposited over the entire structure formed thus far. The photoresist will then be locally masked and lifted off in order to expose the write gap and back gap pedestals 522 and 524 and also to provide vias at the locations of the contacts 540 and 542 (FIG. 6). Once cured, the insulation layer 540 will define a gradually sloping edge 544 at the write gap portion. This gradually sloping edge will be beneficial in defining a low apex angle as will be described in more detail below.

The insulation layer 541 is covered with a thin layer of write gap material 546 which extends over and covers the upper surface 526 of the write gap pedestal 522, thereby separating the first and second poles 518 and 520 in the write gap portion 516 of the yoke 521. The write gap material can be formed of any suitable non-magnetic, electrically insulating material, such as alumina. The write gap material layer 546 is formed so as not to cover the back gap pedestal 524. In addition, with reference to FIG. 6, the write gap material 546 is formed to leave vias at the locations of the first and second contacts 540 and 542.

Completing the write element 504 of the present invention, the second pole 520 is formed over the write gap material layer 546 and also over the back gap pedestal 524 of the first pole, whereby the first and second poles, 518 and 520, together form the yoke 521. At the write gap portion 516 of the yoke 521, the second pole 520 sits atop the write gap material 546 which in turn sits atop the write gap pedestal 522. The space between the first and second poles 518 and 520 in the write gap portion 526 defines a write gap 544.

During use of the constructed read/write head 500, an electrical current will be conducted through the coil 536 as supplied from the contacts 540 and 542 in order to generate a magnetic field as described in above in the background of the invention. The resistance inherent in the coil 536 will cause the electrical current to generate heat according to the formula $W=I^2R$, where W is the amount of heat generated per second, I is the current flowing through the coil and R is the electrical resistance of the coil. In order to maintain a short yoke length YL, the number of winds 538 and the wind thickness Tw must be limited. However with a reduced wind thickness Tw the resistance of the coil increases. In addition, limiting the number of coils requires an increase in current in order to maintain a given magneto-motive force. Both of these factors increase the heat generated by the coil. This heat is problematic for multiple reasons.

First, the heat will cause thermal stresses in the read write/head 500 as the various materials of which it is made expand at different rates. These thermal stresses will cause magnetic domain pattern reconstruction due to the magnetostriction of the magnetic materials used in the head. The magnetic domain movement in the shields will generate magnetic flux which passes through the read sensor. For a high sensitivity MR head, this undesired magnetic flux will be interpreted as a magnetic signal.

The second problem created by the heat generation is that the heat itself when conducted to the read sensor, will degrade the performance of the read sensor 514. Such degradation of read properties is called "Johnson Thermal Noise", and is proportional to $(\omega)(K_BT)(R)$ where $\omega$ is the frequency of the signal being read, $K_BT$ is the temperature of the sensor in degrees Kelvin and R is the resistance of the sensor.

However, the present invention alleviates the effects of this heat generation. The high thermal conductivity of the second dielectric layer 532 on which the coil 536 sits conducts heat away from the coil before that heat can be conducted through to the shield 512 and to the read sensor 514. With reference to FIG. 6, the thermally conductive dielectric layer 534 extends laterally far beyond the yoke 521 and therefore provides a very large heat sink for dissipation of the heat from the coil. In other words, heat generated by the coil 536 will conduct into the dielectric layer 532 and out of the yoke 521 into regions of the read/write head 500 remote from the read sensor 514. This dissipation will also prevent thermal stresses on the read/write head 500. In order to optimize this thermal performance as well as the overall performance of the head 500 it has been found that the read sensor 514 should preferably be a distance of 3–3 ½ microns between the read sensor 514 and the write gap 516 of the write element 504.

Figure 9:
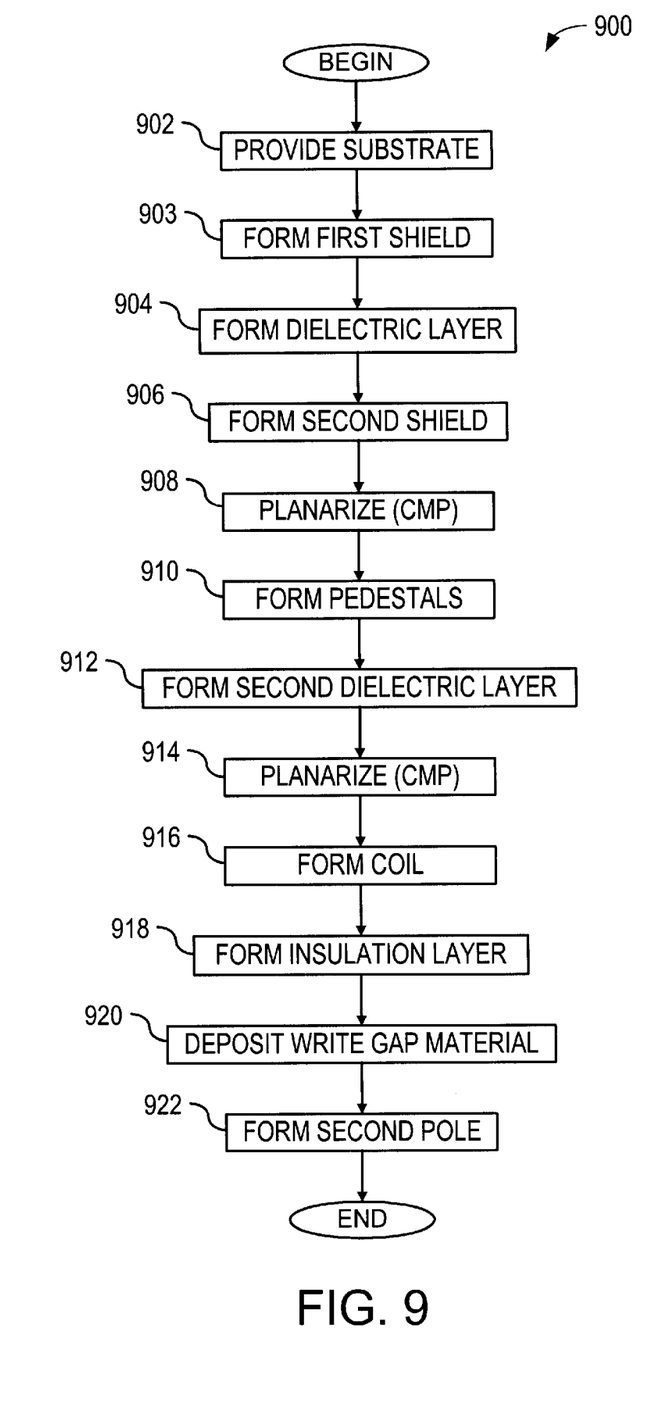
FIG. 9 is a process diagram of a method for forming a read/write head of the present invention.

With reference now to FIG. 9, a method 900 of manufacturing a read/write head of the present invention will now be described. In a step 902 the substrate 506 is provided. The substrate is constructed of a ceramic material and is planarized to have a smooth flat upper surface. In a step 903, the first shield 510 is formed on top of the ceramic substrate 506. Then, in a step 904 the first dielectric layer 508 is formed and the read sensor 514 embedded therein. Thereafter, in a step 906 the second shield 512 is formed over the first dielectric layer 508 and the first dielectric layer further built up to at least the top of the second shield 512. Then, in a step 908, the shield and built up dielectric layer are planarized by a CMP process which creates a smooth flat surface across the top of the shield 512 and the dielectric layer 508.

With the read element 502 constructed, the write element 504 can be formed using the shield 512 as a portion of the first pole 518. In a step 910, the write gap and back gap pedestals 522 and 524 are built up on top of the smooth, planar upper surface of the second shield 512 to form the first pole. The pedestals 522 and 524 can be constructed of a magnetic material such as $Ni_{20}Fe_{80}$. Alternatively, the pedestals 522 and 524 can be constructed of a high Magnetization material such as $Ni_{45}Fe_{55}$. Use of such high Magnetization materials can increase the magnetic performance of the write head, however such materials present manufacturing challenges due to their highly corrosive nature.

In a step 912, the second dielectric layer is formed on top of the first pole 518, covering the pedestals 522 and 524. As shown more clearly with reference to FIG. 6, the second dielectric layer 532 extends beyond the first pole 518 to cover the first CMP dielectric layer 512. This second dielectric layer 532 should be constructed of an electrically insulating, thermally conductive material. While this second dielectric layer 532 could be constructed of any suitable thermally conductive, dielectric material, it is preferably constructed of $Al_3N_4$ and deposited by a reactive sputtering process. The second dielectric layer 532 could also be constructed of $Si_3N_4$ and deposited by a chemical vapor deposition (CVD) process or constructed of $Si_3O_3$ deposited by either sputtering or CVD. Then in a step 914, the second dielectric layer 532 is planarized by a CMP process which exposes the upper surfaces 526 and 528 of pedestals 522 and 524 respectively. The CMP process is conducted sufficiently to generate smooth, flush, flat surfaces 526, 524 and 534 along the plane 530.

Thereafter, in a step 916, the coil 536 is formed on top of the second dielectric layer 532. First, a layer of copper seed is deposited to provide a conductive surface on which to plate the copper coil. Then with the seed deposited, the copper coil is plated using photolithography to provide the desired shape. Once the coil has been plated, the remaining, exposed seed layer can be removed by an etching process. Then in a step 918, the insulation layer 541 can be formed. The insulation layer 541 is deposited as a photoresist which is spun onto the structure. The photoresist is masked, and lifted off to expose the pedestals 522 and 524 and to provide vias for the contacts 540 and 542. The insulation layer is cured by thermal treatment in a furnace which solidifies the photoresist and causes it to have a gently sloped angle at its termination adjacent to the write gap pedestal 526.

In a step 920 the write gap material layer 546 is deposited. While the write gap material can be of any suitable non-magnetic, electrically insulating material, the write gap material is preferably alumina ($Al_2O_3$). After deposition, the write gap material layer can be etched to expose the back gap pedestal 524 and to provide a via at the locations of the contacts 540 and 542. To complete the read/write head 500, in a step 922 the second pole 520 is formed over the write gap material 546 and over the back gap pedestal 524. The second pole 520 is preferably formed of $Ni_{20}Fe_{80}$ and deposited by plating as understood by those skilled in the art. Alternatively, the second pole can be formed of a high Magnetization material such as $Ni_{45}Fe_{55}$ and deposited by plating. The gradual slope 544 of the insulation layer 541 in the write gap portion 516 will cause the pole to define a low apex angle 546. This low apex angle improves the magnetic flux flow at the write gap portion 516 of the yoke 521, and allows the second pole to be formed with a more tightly controlled track-width.

Figure 7:
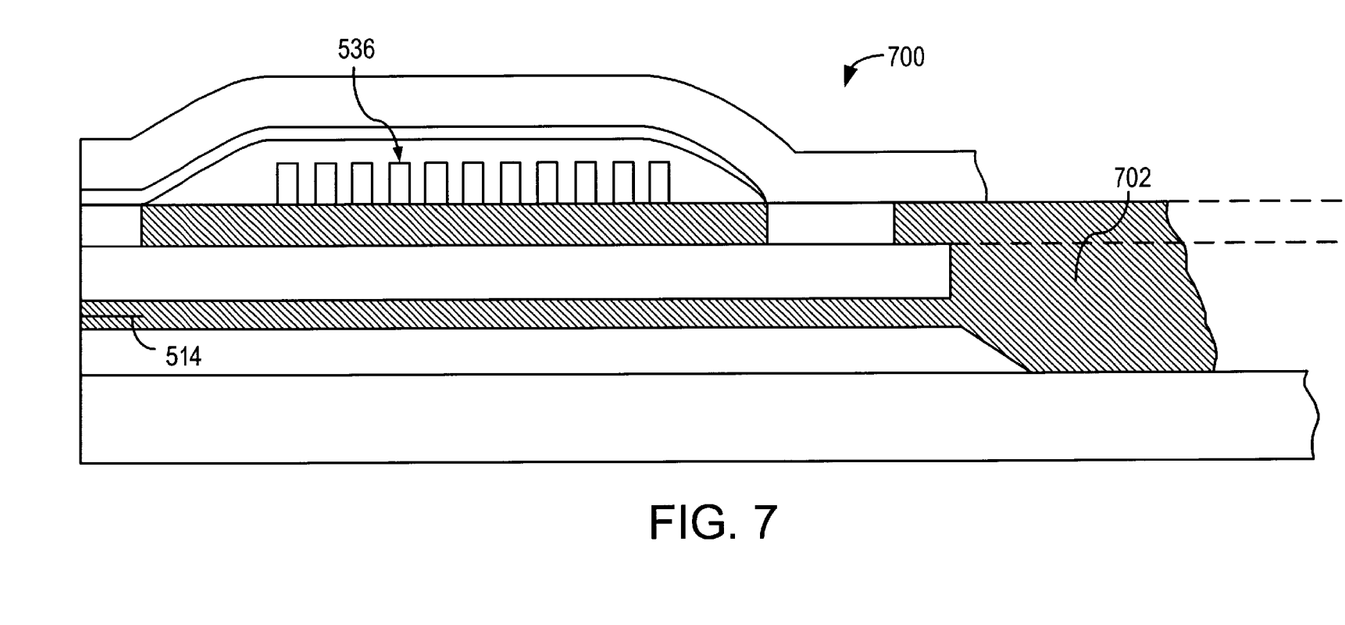
FIG. 7 is a view similar to view 5 of an alternate embodiment of the invention.

With reference to FIG. 7, in an alternate embodiment of the invention 700 a single dielectric material matrix 702 contains the read element 514 and serves as a substrate for the coil 536. In this embodiment, the entirety of the dielectric material 702 consists of a thermally conductive, electrically insulating material. As with the preferred embodiment, such a material could be $Al_3N_4$, $Si_3N_4$, or $Si_3O_3$. Such a design would provide an increased heat sink for dissipation of heat from the coils. While certain head designs might require such an additional heat dissipation, this embodiment would also increase manufacturing costs due to the increased use of the thermally conductive materials.

Figure 8:
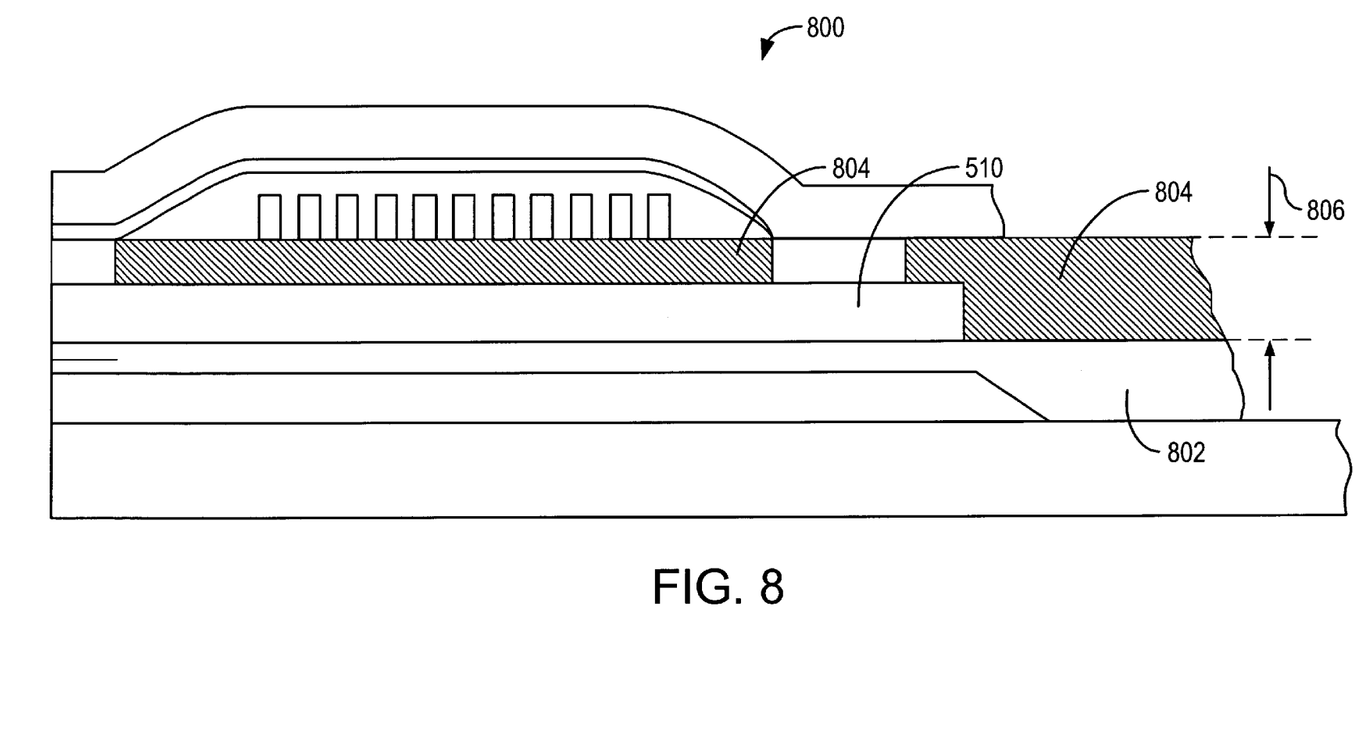
FIG. 8 is a view similar to view 5 of an alternate embodiment of the invention.

With reference to FIG. 8, another embodiment 800 is provided which could be considered a hybrid of two of the previously described embodiments. In this embodiment, a first dielectric layer 802 is constructed of an electrically insulating material such as alumina $Al_2O_3$ as with the preferred embodiment. However, rather than extending to the top of the first shield, the first dielectric layer 802 extends only to the bottom of the second shield 510. In this way, when the second dielectric is formed, it will have an increased thickness 806 in the region beyond the yoke 521. The second insulation layer 804 is constructed of a thermally conductive material as described in the preferred embodiment, however the increased thickness of the second dielectric layer 804 in the region outside of the yoke provides a larger heat sink, providing increased heat dissipation. While this embodiment entails increased manufacturing costs over the preferred embodiment it will not be as expensive as the embodiment illustrated in FIG. 7 which includes thermally conductive dielectric material 702 in both the read 502 and write 504 portions of the head.

In yet another embodiment of the invention, not shown, the write gap material layer can be deposited over the coil rather than over the insulation layer. Similarly, the write gap material could be deposited over the second dielectric layer in which case the coil and insulation layer would be formed on top of the write gap material.

From the above it can be appreciated that the present invention provides a write head, and a method of manufacturing same, which solves the problems of heat generation inherent in high data rate read write heads. The present invention effectively conducts away and dissipates heat while incurring little additional manufacturing expense. While the invention has been described herein in terms of several preferred embodiments, other embodiments of the invention, including alternatives, modifications, permutations and equivalents of the embodiments described herein, will be apparent to those skilled in the art from consideration of the specification, study of the Figures, and practice of the invention. Therefore, the embodiments and preferred features described above should be considered exemplary, with the invention being defined by the appended claims, which therefore include all such alternatives, modifications, permutations and equivalents as fall within the true spirit and scope of the present invention.

What is claimed is:

1. A thin film magnetic head, comprising:
    a first pole having a front end and a back end;
    a second pole having a front end and a back end, said first and second poles being joined at their respective back ends;
    a conducting coil, a portion thereof being disposed between said first and second poles;
    a write gap material layer disposed between said first pole front end and said second pole front end and between said conducting coil and said second pole; and
    a layer of dielectric, thermally conducting material formed of $Al_3N_4$ or $Si_3O_3$ and contacting said coil so as to conduct heat therefrom.

2. A thin film magnetic head, comprising:
    a first pole including a write gap portion at a front end, a back gap portion at a back end, and a first upper surface;
    a back gap pedestal extending from said first upper surface at said back gap portion;
    a write gap pedestal extending from said first upper surface at said write gap portion and including a second upper surface;
    a layer of thermally conductive dielectric material disposed over said first pole between said write gap and back gap pedestals;

a conductive coil, at least a portion thereof being disposed over, and contacting, said layer of dielectric material;

an electrical insulator formed over said coil;

a non-magnetic write gap material layer formed over said second upper surface and over said conductive coil; and a second pole formed over said write gap material and including a back gap portion at a back end contacting said back gap portion of said first pole.

3. A thin film magnetic head as recited in claim 2 wherein said dielectric layer has a thermal conductivity of at least 2 times that of $Al_2O_3$.

4. The thin film magnetic head as recited in claim 2 wherein said second upper surface is planar, and said back gap pedestal and said dielectric layer each have a flat upper surface coplanar with said second upper surface.

5. A thin film magnetic head as recited in claim 2 wherein said dielectric layer formed over said first pole has a thermal conductivity of at least 24 W/m°K at 40° Celsius.

6. A thin film magnetic head as recited in claim 2 wherein said dielectric layer formed over said first pole has a thermal conductivity of at least 65 W/m°K at 65° Celsius.

7. The thin film magnetic head as recited in claim 2 wherein said layer of dielectric material is formed from the group consisting of $Al_3N_4$, $Si_3N_4$, and $Si_3O_3$.

8. A magnetic data storage system, comprising:

a rotatable magnetic disk; and a magnetic head supported above said magnetic disk and including
  a read portion having a read sensor, and
  a write portion having,
    a first pole including a write gap portion at a front end, a gap portion at a back end, and a first upper surface;
    a back gap pedestal extending from said first upper surface at said back gap portion;
    a write gap pedestal extending from said first upper surface at said write gap portion and including a second upper surface;
    a layer of dielectric, thermally conducting material disposed over said first pole between said write gap and back gap pedestals;
    a conductive coil, at least a portion thereof being disposed over, and contacting, said layer of dielectric material;
    an electrical insulator formed over said coil;
    a non-magnetic write gap material layer formed over said second upper surface and over said conductive coil; and
    a second pole formed over said write gap material and including a back gap portion at a back end contacting said back gap portion of said first pole.

9. A thin film magnetic data storage system as recited in claim 8 wherein said dielectric, thermally conducting material has a conductivity of at least 24 W/m°K at 40° Celsius.

10. A thin film magnetic head as recited in claim 8 wherein said thermally conducting material has a conductivity of at least 65 W/m°K at 20° Celsius.

11. The magnetic data storage system recited in claim 8 wherein said read portion further has a first shield layer and a first dielectric layer over said first shield layer, and said read sensor is embedded in said first dielectric layer.

12. The magnetic data storage system recited in claim 8 wherein said layer of dielectric, thermally conducting material and said first layer of electrically insulating material are formed of the same material.

13. The magnetic data storage system recited in claim 12 wherein said same material is selected from the group consisting of $Al_3N_4$, $Si_3N_4$, and $Si_3O_3$.

14. The magnetic data storage system recited in claim 8 wherein said layer of dielectric, thermally conducting material is formed of $Al_2O_3$.

15. The magnetic data storage system recited in claim 8 wherein said layer of dielectric, thermally conducting material further includes a first dielectric upper surface that is coplanar with a bottom surface of said first pole.

16. The magnetic data storage system recited in claim 15 further comprising a second dielectric layer in contact with both said first dielectric upper surface and said first pole.

17. The magnetic data storage system recited in claim 16 wherein said layer of dielectric, thermally conducting material and said second dielectric layer and said first layer of electrically insulating material are each formed of the same material.

18. The magnetic data storage system recited in claim 17 wherein said same material is selected from the group consisting of $Al_3N_4$, $Si_3N_4$, and $Si_3O_3$.

19. The magnetic data storage system recited in claim 16 wherein said second dielectric layer and said first layer of electrically insulating material are formed of the same material and said first dielectric layer is formed of $Al_2O_3$.

20. The magnetic data storage system recited in claim 19 wherein said same material is selected from the group consisting of $Al_3N_4$, $Si_3N_4$, and $Si_3O_3$.

* * * * *